US009874246B2

(12) United States Patent
Carr et al.

(10) Patent No.: US 9,874,246 B2
(45) Date of Patent: Jan. 23, 2018

(54) BEARING INNER RING WITH ANTI-ROTATION FEATURE

(71) Applicant: Schaeffler Technologies AG & Co. KG, Herzogenaurach (DE)

(72) Inventors: Stephen Carr, Waterford, MI (US); Shaun Tate, Grand Blanc, MI (US); Michael Eastman, Petersburg, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/049,769

(22) Filed: Feb. 22, 2016

(65) Prior Publication Data

US 2017/0241478 A1 Aug. 24, 2017

(51) Int. Cl.

*F16C 35/06* (2006.01)
*F16C 19/36* (2006.01)
*F16C 33/58* (2006.01)
*F16C 35/063* (2006.01)

(52) U.S. Cl.

CPC ........ *F16C 35/0635* (2013.01); *F16C 19/364* (2013.01); *F16C 33/586* (2013.01); *F16C 2226/80* (2013.01); *F16C 2361/61* (2013.01)

(58) Field of Classification Search

CPC .... F16C 35/0635; F16C 35/073; F16C 35/06; F16C 2226/70; F16C 2226/72; F16C 2226/76; F16C 2226/80; F16C 19/364; F16C 2361/61; F16C 33/586

See application file for complete search history.

(56) References Cited

U.S. PATENT DOCUMENTS 2,043,856 A * 2/1910 Luckey .................. F16B 39/32 411/199
RE15,187 E * 9/1921 Reynolds ............. F16C 35/063 384/539
3,066,000 A * 11/1962 Howell .............. F16C 35/0635 384/537
3,082,048 A * 3/1963 Jordan .................. F16C 35/063 384/541
3,637,271 A * 1/1972 Bayard .................. F01D 25/16 384/462
4,425,520 A * 1/1984 Hiraga ................. B60H 1/3222 192/84.961
5,178,472 A * 1/1993 Lawson ............. F16C 35/0635 384/460

(Continued)

FOREIGN PATENT DOCUMENTS

JP 61031719 A * 2/1986 .......... F16C 35/0635

*Primary Examiner* — Alan B Waits
(74) *Attorney, Agent, or Firm* — Volpe and Koenig, P.C.

(57) ABSTRACT

A bearing assembly including an anti-rotation feature is provided. The bearing assembly includes a radially outer bearing ring including a radially outer race on a radially inner surface and a radially inner bearing ring and including a radially inner race on a radially outer surface and a radially inner bearing ring retention element. A plurality of rolling elements are supported to roll between the radially outer race and the radially inner race. The anti-rotation feature is provided by a washer including a first washer retention element configured to engage the radially inner bearing ring retention element, and a second washer retention element configured to engage a torque transmitting portion of a shaft.

12 Claims, 5 Drawing Sheets

28 26 1 2 38 14 16 20 42 32 14 30 40 14 34 8 36 22 24

(56) References Cited

U.S. PATENT DOCUMENTS

| | | | | |
|---|---|---|---|---|
| 5,448,944 | A * | 9/1995 | Line | A01F 15/07<br>100/88 |
| 6,630,758 | B2 * | 10/2003 | Aoki | F16C 35/067<br>310/67 R |
| 9,212,556 | B2 * | 12/2015 | Lucas | F01D 5/026 |
| 9,382,948 | B1 * | 7/2016 | Drum | F16C 3/02 |
| 2007/0243013 | A1 * | 10/2007 | Hewitt | B25G 3/18<br>403/351 |
| 2016/0290407 | A1 * | 10/2016 | Hervieux | F16C 23/082 |

* cited by examiner

BEARING INNER RING WITH ANTI-ROTATION FEATURE

FIELD OF INVENTION

The present invention relates to a bearing assembly, and is more particularly related to an anti-rotation feature for a bearing assembly.

BACKGROUND

Assemblies including supported shafts typically require bearings to guide the supported shaft. In situations involving very close guidance, e.g. controlling the location of a gear mesh, an adjusted bearing arrangement is selected and two opposing angular contact bearings are pushed together until a specific preload is achieved. Setting this preload can be challenging during assembly due to the variety of component/part tolerances that are stacked together in the assembly which must be accounted for. The fitting between an inner bearing ring and the shaft is one of the critical tolerances that must be accounted for in this stacked arrangement. Fitment between the inner ring and the shaft is required to keep the inner ring from rotating relative to the shaft, which creates damage called fretting.

A few existing solutions are currently utilized to accomplish a proper fitment: (1) measure all of the parts of bearing assembly, calculate a spacer, and set a sufficient preload; and (2) select a spacer at random, assemble all of the bearing parts, measure a friction torque and compare to a known relationship between preload and friction torque to determine if the preload is properly set, and iteratively disassembling and re-assembling different spacers and repeat torque measurement until reaching a desired configuration. The first solution is undesirable because it is very difficult to efficiently make this measurement to include fitment effects. The second solution is undesirable because it is very hard to disassemble the parts with interference fits.

It would be desirable to provide a simplified anti-rotation device that does not require an interference fit between the shaft and inner bearing ring, but still avoids fretting between the shaft and the inner bearing ring. This would provide a simplified and more efficient configuration to set the preload of the bearing.

SUMMARY

A washer that provides a simplified, reliable anti-rotation feature for a bearing assembly between a shaft and a radially inner bearing ring is provided. The bearing assembly includes a radially outer bearing ring including a radially outer race on a radially inner surface, and a radially inner bearing ring including a radially inner race on a radially outer surface, and a radially inner bearing ring retention element. A plurality of rolling elements are supported to roll between the radially outer race and the radially inner race. The anti-rotation feature is provided by a washer including a first washer retention element configured to engage the radially inner bearing ring retention element, and a second washer retention element configured to engage a torque transmitting portion of a shaft.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
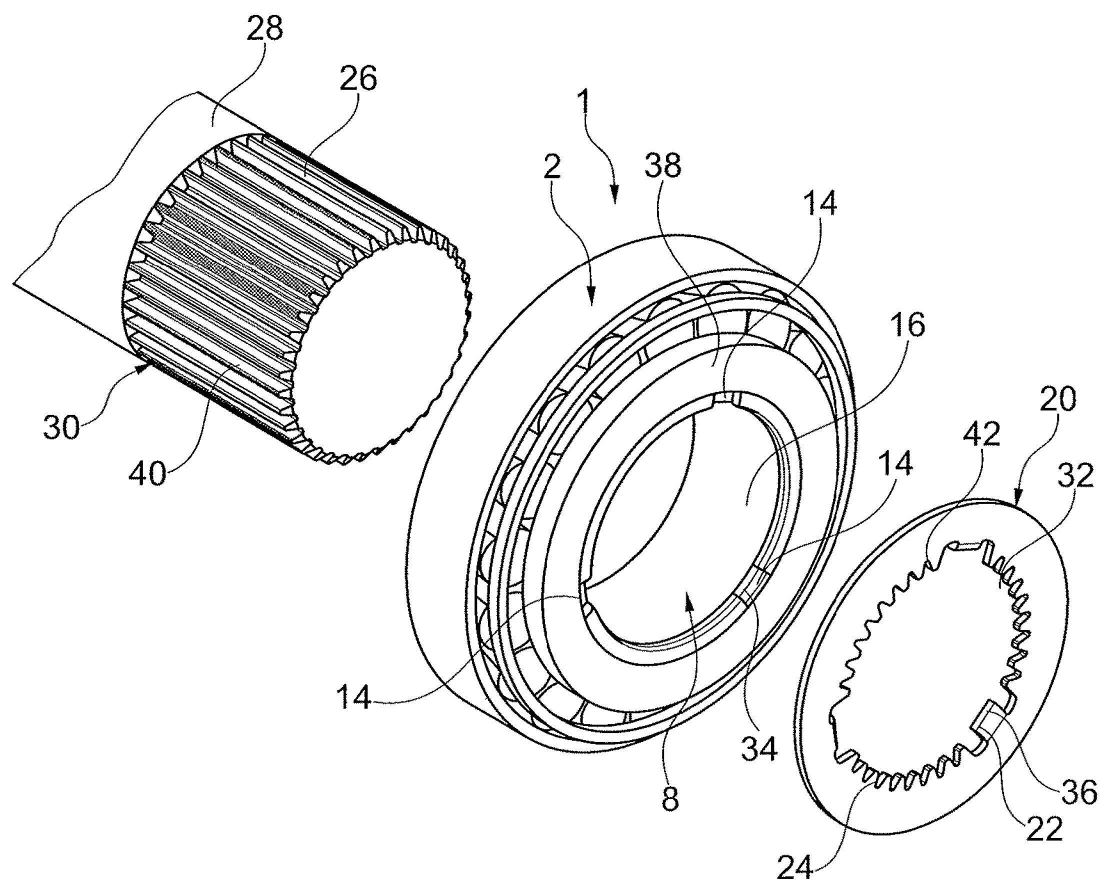
FIG. 1 is a partial front perspective view of a bearing assembly including a washer according to one embodiment.

Certain terminology is used in the following description for convenience only and is not limiting. The words “front,” “rear,” “upper” and “lower” designate directions in the drawings to which reference is made. The words “inwardly” and “outwardly” refer to directions toward and away from the parts referenced in the drawings. “Axially” refers to a direction along the axis of a shaft or rotating part. A reference to a list of items that are cited as “at least one of a, b, or c” (where a, b, and c represent the items being listed) means any single one of the items a, b, or c, or combinations thereof. The terminology includes the words specifically noted above, derivatives thereof and words of similar import.

Figure 3:
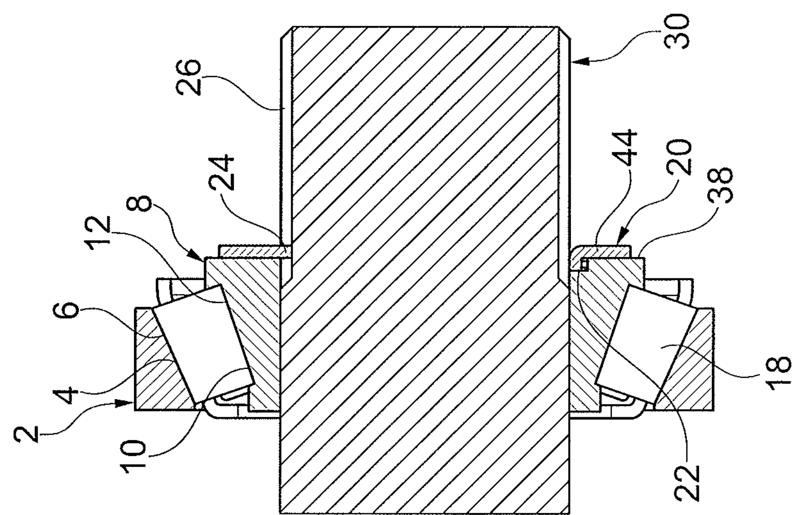
FIG. 3 is a partial cross-section view taken along line 3-3 of FIG. 2.
Figure 2:
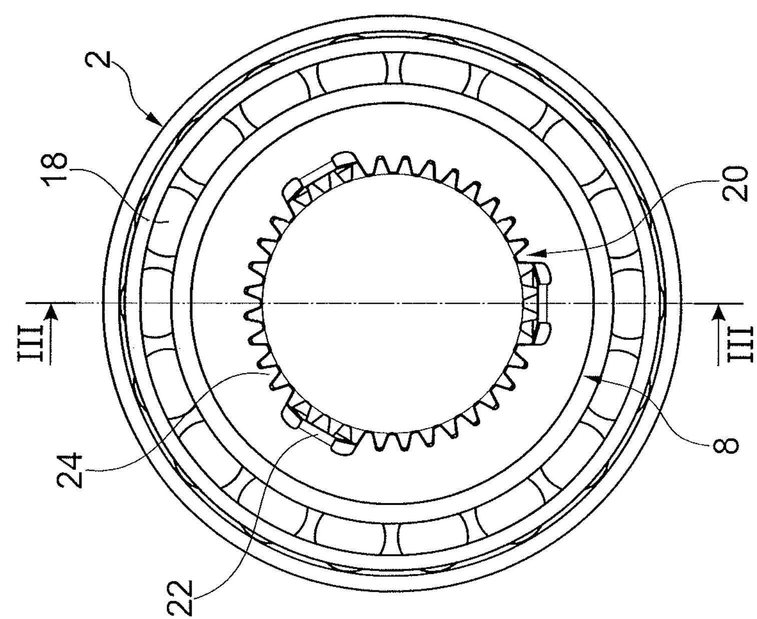
FIG. 2 is a view in an axial direction of the bearing assembly of FIG. 1.

FIGS. 1-3 show an embodiment of a bearing assembly 1 including an anti-rotation feature provided by a washer 20. The bearing assembly 1 includes a radially outer bearing ring 2 including a radially outer race 4 on a radially inner surface 6 shown in FIG. 3, and a radially inner bearing ring 8 including a radially inner race 10 on a radially outer surface 12, also shown in FIG. 3. The radially inner bearing ring 8 includes a radially inner bearing ring retention element 14. A plurality of rolling elements 18 are supported to roll between the radially outer race 4 and the radially inner race 10. As shown in FIGS. 1-5, the plurality of rolling elements 18 are tapered rolling elements. One of ordinary skill in the art recognizes that other types of rolling elements can be used, for example spherical rolling elements or cylindrical rolling elements. One of ordinary skill in the art also recognizes that alternative arrangements of bearing assemblies could be used, including a tandem ball bearing assembly.

An anti-rotation feature of the bearing assembly 1 is provided via the washer 20. As shown in FIGS. 1-5, the washer 20 is arranged concentrically around a shaft 30. The washer 20 includes a first washer retention element 22 configured to engage the radially inner bearing ring retention element 14, and a second washer retention element 24 configured to engage a torque transmitting portion 26 of a shaft 30. The torque transmitting portion 26 is preferably formed on a radially outer surface 28 of the shaft 30. The torque transmitting portion 26 of the shaft is understood by those of ordinary skill in the art to include any non-round portion of a shaft, for example a keyed portion or a polygonal portion. In the embodiment of FIGS. 1-3, the second washer retention element 24 is formed on a radially inner surface 32 of the washer 20.

In the embodiment of FIGS. 1-3, the radially inner bearing ring retention element 14 comprises at least one notch 34, and the first washer retention element 22 comprises at least one axially extending projection 36 configured to engage the at least one notch 34 of the radially inner bearing ring 8. The at least one notch 34 of the radially inner bearing ring 8 is preferably recessed from an axial end face 38 of the radially inner bearing ring 8, which allows for simplified formation of the radially inner bearing ring 8 and the notch 34. In the embodiment of FIGS. 1-3, the torque transmitting portion 26 of the shaft 30 comprises a first set of teeth 40, and the second washer retention element 24 comprises a second set of teeth 42 configured to mate with the first set of teeth 40 of the torque transmitting portion 26 of the shaft 30. In the embodiment of FIGS. 1-3, an axial end face 44 of the washer 20 abuts the first axial end face 38 of the radially inner bearing ring 8 in an installed state, as shown in FIG. 3. As shown in FIGS. 1-3, the torque transmitting portion 26 of the shaft 30 includes splined teeth. One of ordinary skill in the art recognizes that any non-round, torque transmitting element can be provided as the torque transmitting portion 26 on the shaft 30, and the second washer retention element 24 is configured with a complementary shape to mate with the torque transmitting portion 26 of the shaft 30.

Figure 4:
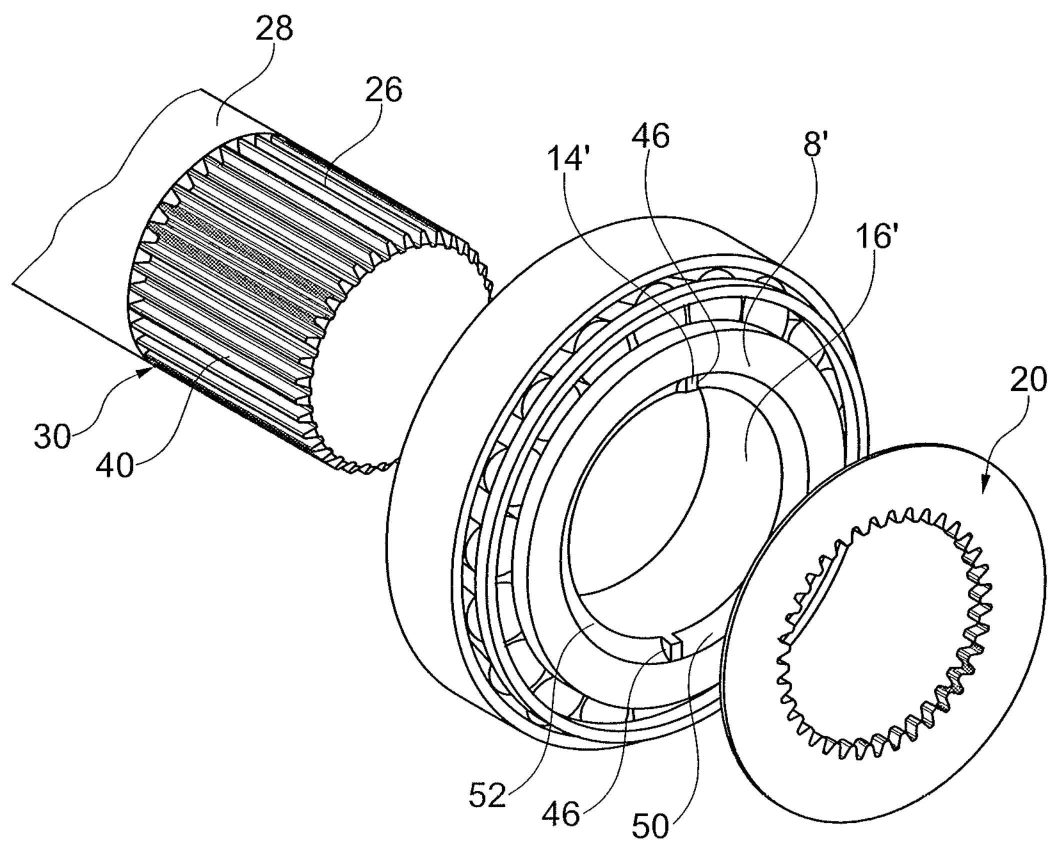
FIG. 4 is a partial front perspective view of a bearing assembly including a washer according to another embodiment.
Figure 5:
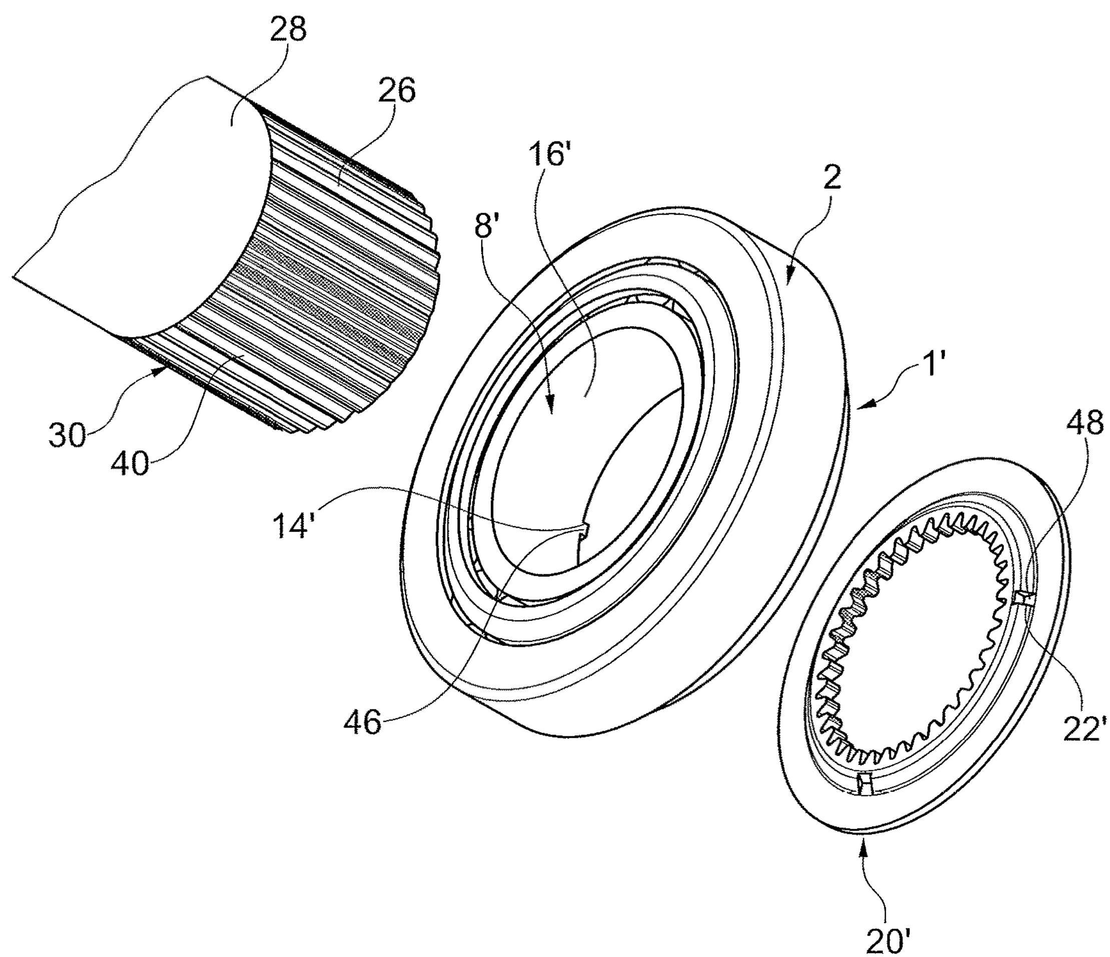
FIG. 5 is a partial rear perspective view of the bearing assembly of FIG. 4.
Figure 6:
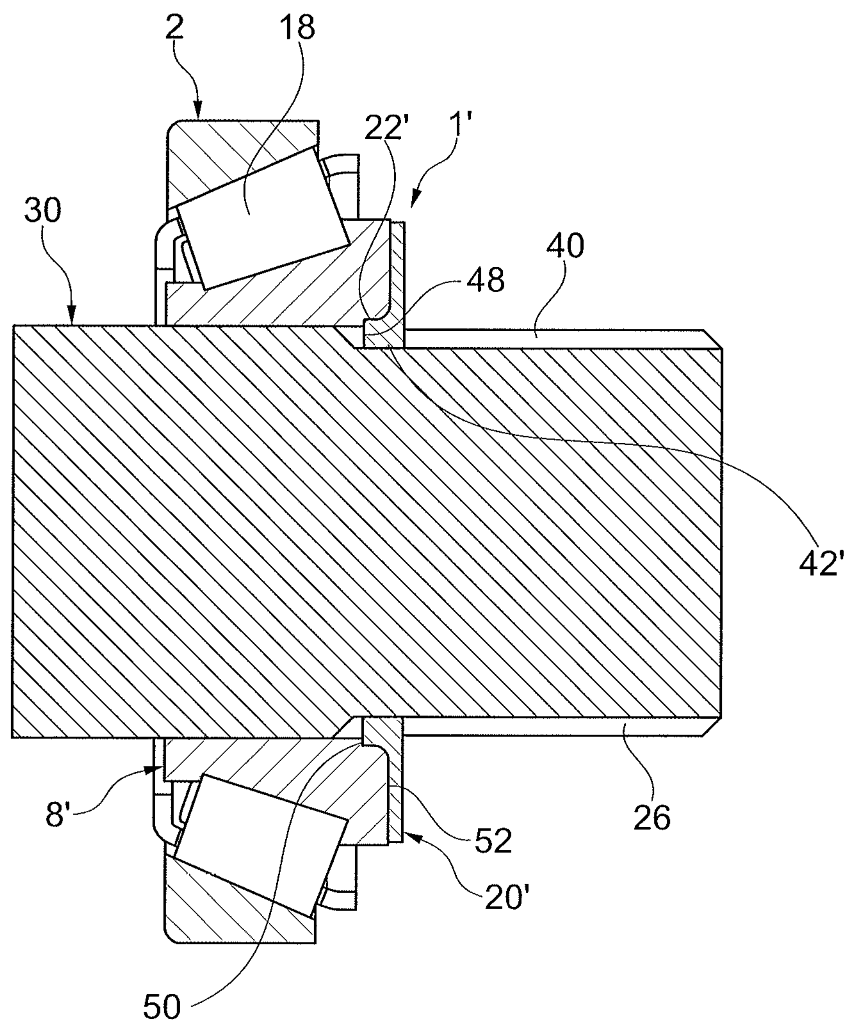
FIG. 6 is a partial cross-section view of the bearing assembly of FIGS. 4 and 5.

FIGS. 4-6 illustrate another embodiment of the bearing assembly 1' that includes a radially inner bearing ring retention element 14' with at least one axially extending projection 46. In this embodiment, the washer 20' includes a set of teeth 42' to mate with the splined end of the shaft 30, similar to the embodiment of FIGS. 1-3. The washer 20' includes a first washer retention element 22' comprising an axially extending annular projection having at least one notch 48 configured to be engaged by the at least one axially extending projection 46 of the radially inner bearing ring 8'. The radially inner bearing ring retention element 14' comprises a circumferential groove 50 at a first axial end 52 of the radially inner bearing 8' in which the axially extending, annular projection on the washer 20' is received, and the at least one axially extending projection 46 does not extend beyond an axial end face 54 of the first axial end 52 of the radially inner bearing ring 8'. One of ordinary skill in the art recognizes that the arrangement and number of notches 48 formed in the washer 20' can be varied, depending on a specific bearing application.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A bearing assembly comprising:

a radially outer bearing ring including a radially outer race on a radially inner surface;

a radially inner bearing ring including a radially inner race on a radially outer surface and a radially inner bearing ring retention element;

a plurality of rolling elements supported to roll between the radially outer race and the radially inner race; and a washer defined by a flat disk body defining a radial outermost edge and a radial innermost edge, the disk body extending in a radial plane and including a first washer retention element configured to engage the radially inner bearing ring retention element, and a second washer retention element configured to engage a torque transmitting portion of a shaft, the first washer retention element and the second washer retention element are both defined along the radial innermost edge of the disk body and the first washer retention element and the second washer retention element are spaced radially inward from the radial outermost edge of the flat disk body, the first washer retention element extending axially from the radial plane of the disk body, and the second washer retention element extending radially inwardly from the disk body and aligned with the radial plane of the disk body.

2. The bearing assembly of claim 1, wherein the torque transmitting portion of the shaft is formed on a radially outer surface of the shaft.

3. The bearing assembly of claim 1, wherein the first washer retention element and the second washer retention element are formed on a radially inner surface of the washer.

4. The bearing assembly of claim 1, wherein the radially inner bearing ring retention element comprises at least one notch, and the first washer retention element comprises at least one axially extending projection configured to engage the at least one notch of the radially inner bearing ring.

5. The bearing assembly of claim 4, wherein the at least one notch of the radially inner bearing ring is recessed from an axial end face of the radially inner bearing ring.

6. The bearing assembly of claim 1, wherein the torque transmitting portion of the shaft comprises a first set of teeth, and the second washer retention element comprises a second set of teeth configured to mate with the first set of teeth of the torque transmitting portion of the shaft.

7. The bearing assembly of claim 1, wherein an axial end face of the washer abuts a first axial end face of the radially inner bearing ring in an installed state.

8. The bearing assembly of claim 1, wherein the radially inner bearing ring retention element comprises at least one axially extending projection, and the first washer retention element comprises at least one notch configured to receive the at least one axially extending projection of the radially inner bearing ring.

9. The bearing assembly of claim 1, wherein the radially inner edge of the disk body is defined continuously by either the first washer retention element or the second washer retention element.

10. A bearing assembly comprising:

a radially outer bearing ring including a radially outer race on a radially inner surface;

a radially inner bearing ring including a radially inner race on a radially outer surface and a radially inner bearing ring retention element;

a plurality of rolling elements supported to roll between the radially outer race and the radially inner race; and a washer including a first washer retention element configured to engage the radially inner bearing ring retention element, and a second washer retention element configured to engage a torque transmitting portion of a shaft, wherein the radially inner bearing ring retention element comprises at least one axially extending projection, and the first washer retention element comprises at least one notch configured to receive the at least one axially extending projection of the radially inner bearing ring, wherein the radially inner bearing ring retention element comprises a circumferential groove at a first axial end of the radially inner bearing and the at least one axially extending projection is located in the groove and extends axially less than or up to an axial end face of the radially inner bearing ring.

11. A bearing assembly comprising:

a radially outer bearing ring including a radially outer race on a radially inner surface;

a radially inner bearing ring including a radially inner race on a radially outer surface and a notch;

a plurality of rolling elements supported to roll between the radially outer race and the radially inner race;

a shaft including a first plurality of teeth on a radially outer surface of the shaft; and a washer defined by a flat disk body defining a radial outermost edge and a radial innermost edge, the disk body extending in a radial plane and including an axial projection configured to engage the notch of the radially inner bearing ring, and a second plurality of teeth configured to engage the first plurality of teeth of the shaft, the axial projection and the second plurality of teeth are both defined along the radial innermost edge of the disk body and the axial projection and the second plurality of teeth are spaced radially inward from the radial outermost edge of the flat disk body, the axial projection extending axially from the radial plane of the disk body, and the second plurality of teeth extending radially inwardly from the disk body and aligned with the radial plane of the disk body.

12. The bearing assembly of claim 11, wherein the axial projection is circumferentially spaced in between the second plurality of teeth.

* * * * *